US012654699B2

(12) United States Patent
Cho et al.

(10) Patent No.: US 12,654,699 B2
(45) Date of Patent: Jun. 16, 2026

(54) VEHICLE CONTROL SYSTEM AND METHOD, AND VEHICLE INCLUDING THE SAME

(71) Applicants: Hyundai Motor Company, Seoul (KR); Kia Corporation, Seoul (KR)

(72) Inventors: Jin Kyeom Cho, Suwon-si (KR); Jun Yong Lee, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 127 days.

(21) Appl. No.: 18/811,477

(22) Filed: Aug. 21, 2024

(65) Prior Publication Data

US 2025/0289426 A1 Sep. 18, 2025

(30) Foreign Application Priority Data

Mar. 15, 2024 (KR) ........................ 10-2024-0036547

(51) Int. Cl.
*B60W 30/14* (2006.01)
*B60W 50/00* (2006.01)
*B60W 60/00* (2020.01)

(52) U.S. Cl.
CPC ...... *B60W 30/146* (2013.01); *B60W 50/0097* (2013.01); *B60W 60/001* (2020.02); *B60W 2520/10* (2013.01); *B60W 2540/10* (2013.01); *B60W 2540/12* (2013.01); *B60W 2555/20* (2020.02)

(58) Field of Classification Search
CPC ............. B60W 30/146; B60W 60/001; B60W 50/0097; B60W 2555/20; B60W 2520/10; B60W 2540/10; B60W 2540/12
See application file for complete search history.

(56) References Cited

FOREIGN PATENT DOCUMENTS

| | | | | |
|---|---|---|---|---|
| CN | 115158259 A | * | 10/2022 | .......... B60T 8/17551 |
| JP | 2010130874 A | * | 6/2010 | .......... B60T 8/17551 |
| JP | 6933452 B2 | * | 9/2021 | ............ B60W 10/18 |

* cited by examiner

*Primary Examiner* — Vivek D Koppikar
*Assistant Examiner* — Jeffrey R Chalhoub
(74) *Attorney, Agent, or Firm* — Banner & Witcoff, Ltd.

(57) ABSTRACT

An apparatus for controlling autonomous driving of a vehicle is introduced. The apparatus may comprise at least one communication circuit configured to communicate with an external device, and a processor configured to identify, based on information provided through the at least one communication circuit, an average speed and atmospheric pressure change on a driving path of the vehicle, determine, based on the atmospheric pressure change and an atmospheric pressure change limit value, a speed limit, output, based on the average speed and the speed limit, a vehicle speed control value, and control, based on the output vehicle speed control value, autonomous driving of the vehicle.

18 Claims, 7 Drawing Sheets

_100_

_160_ atmospheric pressure
change prediction module — _161_ speed limit
determination module — _162_ speed control value
output module — _163_

VEHICLE CONTROL SYSTEM AND METHOD, AND VEHICLE INCLUDING THE SAME

CROSS-REFERENCE TO RELATED APPLICATION(S)

This application claims the benefit of priority under 35 U.S.C. 119 Korean Patent Application No. 10-2024-0036547, filed on Mar. 15, 2024, in the Korean Intellectual Property Office, the disclosure of which is incorporated herein by reference in its entirety.

TECHNICAL FIELD

The present disclosure relates to vehicle control technology, and more particularly, to a vehicle control system and method that may control a vehicle by reflecting changes in atmospheric pressure, and a vehicle including the same.

BACKGROUND

Vehicles are equipped with various types of technology to assist drivers in driving.

Autonomous vehicles drive on roads of various altitudes and slopes using position information, road information, weather information, etc., while driving from a departure to a destination. Sudden changes in altitude may cause rapid deceleration and acceleration, and may cause health problems, such as dizziness, headaches, vomiting, and the like of drivers and passengers.

Therefore, technology that may efficiently control vehicles considering altitude may improve the driving condition of the vehicles and/or traffic safety.

This background information is provided only for better understanding of the present disclosure and does not constitute prior art.

SUMMARY

According to the present disclosure, an apparatus for controlling autonomous driving of a vehicle, the apparatus comprising at least one communication circuit configured to communicate with an external device, and a processor configured to identify, based on information provided through the at least one communication circuit, an average speed and atmospheric pressure change on a driving path of the vehicle; determine, based on the atmospheric pressure change and an atmospheric pressure change limit value, a speed limit; output, based on the average speed and the speed limit, a vehicle speed control value; and control, based on the output vehicle speed control value, autonomous driving of the vehicle.

The apparatus, wherein the processor is configured to predict, based on a driving distance of the vehicle between a prediction starting point and a prediction endpoint, the average speed.

The apparatus, wherein the processor is configured to predict, based on the driving distance, a first atmospheric pressure at the prediction starting point, a second atmospheric pressure at the prediction endpoint, and the average speed, the atmospheric pressure change.

The apparatus, wherein the processor is configured to determine, based on a look-up table, the atmospheric corresponding to the pressure change limit value atmospheric pressure change; and determine the speed limit based on the atmospheric pressure change limit value, a driving distance between a prediction starting point and a prediction endpoint, a first atmospheric pressure at the prediction starting point, and a second atmospheric pressure at the prediction endpoint.

The apparatus, further comprising an input interface configured to receive control level information, wherein the processor is further configured to determine, based on applying a weight to the atmospheric pressure change limit value, the speed limit, wherein the weight corresponds to the control level information.

The apparatus, wherein the processor is configured to output, based on a difference between a value of the speed limit and a value of the average speed, exceeding a first reference speed value, the speed limit as the vehicle speed control value.

The apparatus, wherein, after outputting the speed limit, the processor is configured to determine whether an acceleration demand or a deceleration demand is input; determine, based on the acceleration demand or the deceleration demand, whether the difference is equal to or less than the first reference speed value and greater than a second reference speed value; and output, based on determining whether the difference is equal to or less than the first reference speed value and greater than the second reference speed value, an acceleration torque or a deceleration torque.

The apparatus, wherein the processor is configured to output, based on the difference being equal to or less than the first reference speed value and greater than the second reference speed value, the acceleration torque or the deceleration torque, wherein the acceleration torque or the deceleration torque are adjusted based on the acceleration demand or the deceleration demand.

The apparatus, wherein the processor is configured to output the acceleration torque by decreasing, based on an acceleration adjustment ratio, the acceleration demand; or output the deceleration torque by increasing, based on a deceleration adjustment ratio, the deceleration demand.

According to the present disclosure, a method performed by a vehicle for controlling autonomous driving 41 of the vehicle, comprising identifying, based on information provided through at least one communication circuit configured to communicate with an external device, an average speed and atmospheric pressure change on a driving path of the vehicle; determining, based on the atmospheric pressure change and an atmospheric pressure change limit value, a speed limit; outputting, based on the average speed and the speed limit, a vehicle speed control value; and controlling, based on the output vehicle speed control value, autonomous driving of the vehicle.

The method, wherein predicting the average speed and the atmospheric pressure change comprises predicting, based on a driving distance of the vehicle between a prediction starting point and a prediction endpoint, the average speed for a unit of time.

The method, wherein predicting the average speed and the atmospheric pressure change comprises predicting the atmospheric pressure change based on the driving distance of the vehicle, a first atmospheric pressure at the prediction starting point, a second atmospheric pressure at the prediction endpoint, and the average speed.

The method, wherein determining the speed limit comprises determining, based on a look-up table, the atmospheric pressure change limit value corresponding to the atmospheric pressure change, and determining, based on the atmospheric pressure change limit value, a driving distance between a prediction starting point and a prediction endpoint, a first atmospheric pressure at the prediction starting point, and a second atmospheric pressure at the prediction endpoint, the speed limit.

The method, further comprising receiving control level information, wherein determining the speed limit comprises further determining, based on applying a weight to the atmospheric pressure change limit value, the speed limit, wherein the weight corresponds to the control level information.

The method, wherein outputting the vehicle speed control value comprises outputting, based on a difference between a value of the speed limit and a value of the average speed, exceeding a first reference speed value, the speed limit as the vehicle speed control value.

The method, wherein outputting the speed limit comprises determining whether an acceleration demand or a deceleration demand is input, determining, based on the acceleration demand or the deceleration demand, whether the difference is equal to or less than the first reference speed value and greater than a second reference speed value, and outputting, based on determining whether the difference is equal to or less than the first reference speed value and greater than the second reference speed value, an acceleration torque or a deceleration torque.

The method, wherein outputting the vehicle speed control value further comprises outputting, based on determining whether the difference is equal to or less than the first reference speed value and greater than the second reference speed value, the acceleration torque or the deceleration torque, wherein the acceleration torque or the deceleration torque are adjusted based on the acceleration demand or the acceleration demand.

The method, wherein outputting the acceleration torque or the deceleration torque comprises outputting the acceleration torque by decreasing, based on an acceleration adjustment ratio, the acceleration demand, or outputting the deceleration torque by increasing, based on a deceleration adjustment ratio, the deceleration demand.

According to the present disclosure, a vehicle comprising at least one communication circuit configured to provide information configured to control autonomous driving of the vehicle, and a vehicle control apparatus configured to predict, based on the information, an average speed and an atmospheric pressure change on a driving path of the vehicle, determine, based on the atmospheric pressure change and an atmospheric pressure change limit value, speed limit, and output, based on the average speed and the speed limit, a vehicle speed control value for controlling autonomous driving of the vehicle.

The vehicle, further comprising a powertrain configured to generate power to drive the vehicle, and a drive controller configured to control, based on the vehicle speed control value output from the vehicle control apparatus, the powertrain.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
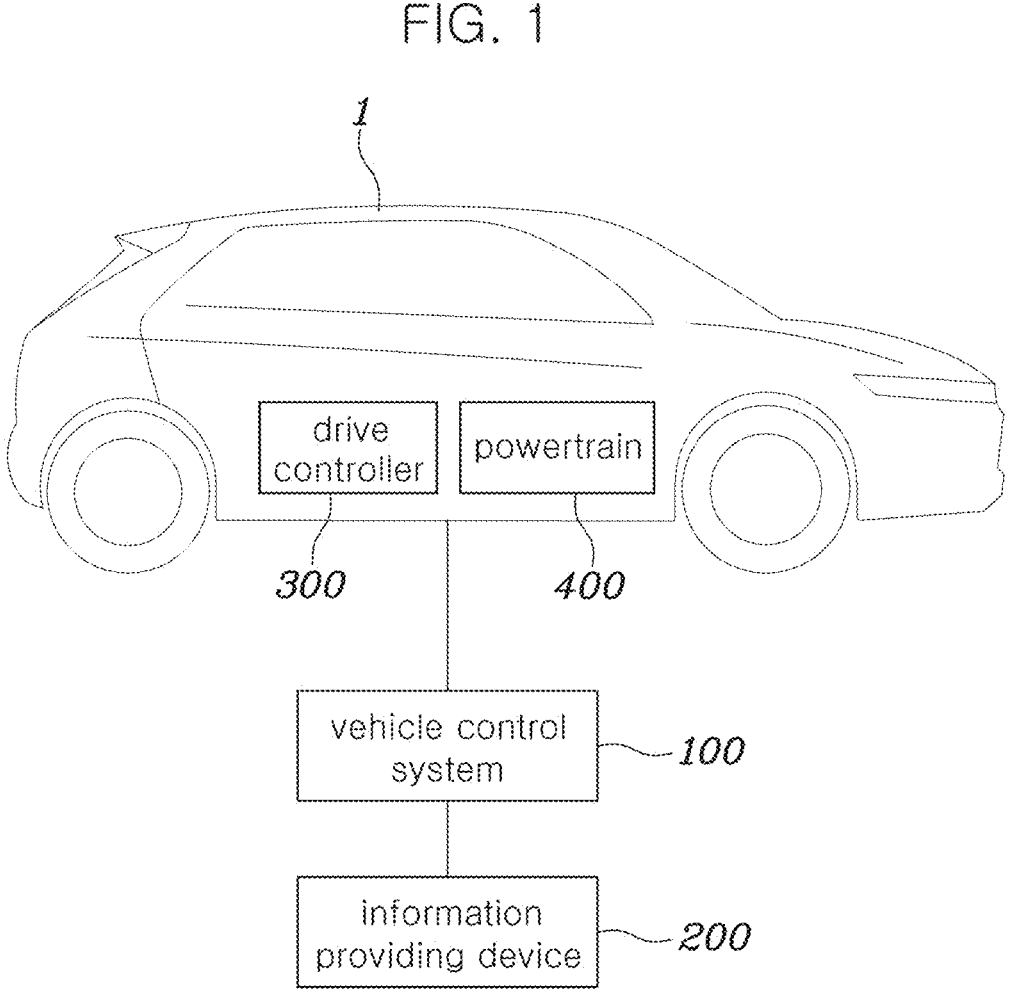
FIG. 1 shows an example of a vehicle including a vehicle control system according to one example of the present disclosure.

Advantages and features of the present disclosure and methods for achieving them will become apparent from the descriptions of examples herein below with reference to the accompanying drawings. However, the present disclosure is not limited to the examples disclosed herein but may be implemented in various different forms. The examples are provided to make the description of the present disclosure thorough and to fully convey the scope of the present disclosure to those skilled in the art. It is to be noted that the scope of the present disclosure is defined only by the claims.

The shapes, sizes, ratios, angles, and numbers of elements given in the drawings are merely exemplary, and thus, the present disclosure is not limited to the illustrated details. The same reference numerals designate the same or similar elements throughout the specification. In relation to describing the present disclosure, if the detailed description of the relevant known technology is determined to unnecessarily obscure the gist of present disclosure, the detailed description may be omitted. In the following description of the examples, the terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof, unless the term "only" is used. As used herein, singular expressions may be intended to encompass plural expressions as well, unless the context clearly indicates otherwise. The terms such as "unit", "module", and the like refer to one or more units for processing at least one function or operation, which may be implemented by hardware (e.g., circuit, circuitry, ASIC, etc.), software, or a combination thereof.

If interpreting a component, the component is interpreted to include an error range even if there is not separate explicit description of the error range.

In the case of a description of a temporal relationship, if the temporal relationship is described using "after," "sequentially," "next," "before," etc., the temporal relationship may include a non-continuous case unless the term "immediately" or "directly" is used.

Although the terms "first," "second," etc. may be used herein to describe various elements, components, regions, layers and/or sections, these elements, components, regions, layers and/or sections should not be limited by these terms. These terms may be only used to distinguish one element, component, region, layer or section from other elements, components, regions, layers or sections. Therefore, a first element described hereinafter may be termed a second element, without departing from the scope of the disclosure.

In describing elements of the present disclosure, the terms "first," "second," "A," "B," "(a)," and "(b)" may be used. These terms are only used to distinguish the element from other elements, and the nature, sequence, order, or number of the element are not limited by the terms. If an element or layer is referred to as being "connected to" or "coupled to" another element or layer, it may be directly connected or coupled to the other element or layer, or intervening elements or layers may be present unless clearly indicated by the context.

In the following description of the present disclosure, "at least one" should be understood to include any combination of one or more of the associated elements. For example, "at least one of first, second, or third elements" may include not only the first, second, or third component, but also all combinations of two or more of the first, second, and third elements.

Respective features of various examples of the present disclosure may be coupled to or combined with each other partially or entirely, and may be technically variously interconnected and operated, and the respective examples may be implemented independently of each other or be implemented together in a related relationship.

Scales of elements shown in the drawings are different from the actual scales thereof for convenience of explanation, and therefore, the present disclosure is not limited to the scales shown in the drawings.

Hereinafter, a vehicle control system and method, and a vehicle including the same according to examples of the present disclosure will be described with reference to the accompanying drawings.

FIG. 1 shows an example of a vehicle 1 including a vehicle control system 100 according to one example of the present disclosure.

Referring to FIG. 1, the vehicle 1 may include the vehicle control system 100 according to one example of the present disclosure.

Further, the vehicle 1 may include an information providing device 200 which provides information to the vehicle control system 100 for autonomous driving of the vehicle 1, a drive controller 300 which controls subcomponents based on a vehicle speed control value input from the vehicle control system 100, and a powertrain 400 which is operated depending on control of the drive controller 300.

The vehicle control system 100 may control at least one of the speed, acceleration, or deceleration of the vehicle 1 based on information input from the information providing device 200 perform to driver-assistance functions/operations, reduce speed based on forward collision warning, adjust lane based on a lane detection, etc. for autonomous driving of the vehicle 1.

According to one example, the vehicle control system 100 may determine the vehicle speed control value based on the input information, and the vehicle speed control value may include at least one of a speed limit, a deceleration torque, or an acceleration torque.

According to one example, the vehicle control system 100 may predict an atmospheric pressure change based on a driving distance, an average speed, atmospheric pressure at a starting point, and atmospheric pressure at an endpoint based on unit time with respect to an expected driving path.

The vehicle control system 100 may determine the speed limit based on the predicted atmospheric pressure change and a predetermined atmospheric pressure change limit value.

According to one example, the vehicle control system 100 may determine the predetermined atmospheric pressure change limit value corresponding to the atmospheric pressure change, and may determine the speed limit by applying the determined atmospheric pressure change limit value to a predetermined algorithm.

According to one example, the vehicle control system 100 may determine the predetermined atmospheric pressure change limit value corresponding to the atmospheric pressure change, and may determine the speed limit depending on the predetermined algorithm after applying a weight depending on control level information to the determined atmospheric pressure change limit value.

The vehicle control system 100 may limit the speed of the vehicle 1 based on the predicted average speed and the determined speed limit.

According to one example, the vehicle control system 100 may limit the speed of the vehicle 1 to the determined speed limit if a value obtained by subtracting the determined speed limit from the predicted average speed exceeds a predetermined first reference speed value.

For example, the vehicle control system 100 may output the speed limit to the driving controller 300 so that the driving controller 300 controls the powertrain 400 based on the speed limit.

The vehicle control system 100 may control the acceleration and deceleration of the vehicle 1 based on the predicted average speed and the determined speed limit.

According to one example, the vehicle control system 100 may control the acceleration and deceleration of the vehicle 1 if the value obtained by subtracting the determined speed limit from the predicted average speed is equal to or less than the predetermined first reference speed value and exceeds a predetermined second reference speed value.

According to one example, in order to perform speed limit control in preference to acceleration/deceleration control, the first reference speed value may be set to be a value greater than the second reference speed value. That is, acceleration/deceleration control may be performed in the state in which speed limit has been established.

According to one example, the vehicle control system 100 may perform only speed limit control, may control only acceleration/deceleration control, or may independently perform speed limit control and acceleration/deceleration control.

If an acceleration demand is input, the vehicle control system 100 may determine the acceleration torque of the vehicle 1 by adjusting the acceleration demand according to a predetermined acceleration adjustment ratio.

For example, the acceleration adjustment ratio may be set through vehicle tests. For example, the acceleration adjustment ratio may be set differently depending on a difference between the speed limit and the average speed. For example, the acceleration adjustment ratio may have a larger value as the difference between the speed limit and the average speed increases.

If a deceleration demand is input, the vehicle control system 100 may determine the deceleration torque of the vehicle 1 by adjusting the deceleration demand according to a predetermined deceleration adjustment ratio.

For example, the deceleration adjustment ratio may be set through vehicle tests. For example, the deceleration adjustment ratio may be set differently depending on a difference between the speed limit and the average speed. For example, the deceleration adjustment ratio may have a larger value as the difference between the speed limit and the average speed increases.

According to one example, the vehicle control system 100 may output the determined acceleration torque or deceleration torque to the driving controller 300 so that the driving controller 300 controls the powertrain 400 based on the acceleration torque or the deceleration torque. For example, the driving controller 300 may control acceleration (e.g., controlling acceleration pedal), deceleration (e.g., controlling braking), driving wheel, etc. Acceleration torque is a torque used to accelerate a system or object. It is the rotational equivalent of the force used to accelerate a mass in linear motion. This torque is used to increase an angular velocity of a rotating system from rest or from a lower speed to a higher speed. Deceleration torque is a torque used to decelerate a system or object. It is a torque used to reduce the angular velocity of the rotating system, practically acting as a braking force.

For example, the vehicle control system 100 may include a hybrid control unit (HCU), but is not limited thereto.

The information providing device 200 may provide various information used for operation of the vehicle control system 100.

According to one example, the information providing device 200 may include a driving environment providing device implemented to provide road information and atmospheric pressure information on the expected driving path of the vehicle 1. For example, the driving environment providing device may be a navigation system, but is not limited thereto.

According to one example, the information providing device 200 may include a vehicle speed sensor implemented to provide speed information of the vehicle 1.

According to one example, the information providing device 200 may include an accelerator position sensor (APS) which outputs an acceleration demand corresponding to pressure applied to an accelerator pedal by a driver, and a brake position sensor (BPS) which outputs a deceleration demand corresponding to pressure applied to a brake pedal by the driver.

However, information provided by the information providing device 200 is not limited t the above information, and the information providing device 200 may include other components configured to provide information.

The driving controller 300 may control the powertrain 400 of the vehicle 1 based on the vehicle speed control value provided from the vehicle control system 100.

For example, the driving controller 300 may control the powertrain 400 by receiving at least one of the speed limit, the deceleration torque, or the acceleration torque.

For example, the driving controller 300 may include a motor control unit (MCU), a transmission control unit (TCU), a clutch control unit (CCU), an engine control unit (ECU), a battery management system (BMS), etc., and the configuration of the driving controller 300 is not limited thereto.

The powertrain 400 may be driven under the control of the driving controller 300 to generate power to drive the vehicle 1.

For example, the powertrain 400 may be implemented as a transmission mounted electric drive (TMED) in which a drive motor and a transmission are connected, but the implementation of the powertrain 400 is not limited thereto.

For example, the powertrain 400 includes an engine and a motor which serve as power sources to drive the vehicle 1, an engine clutch interposed between the engine and the motor, a transmission connected to the output side of the motor, a battery connected to the motor through an inverter and serving as the power source of the motor, and the inverter configured to drive the motor, but the configuration of the powertrain 400 is not limited thereto.

Figure 2:
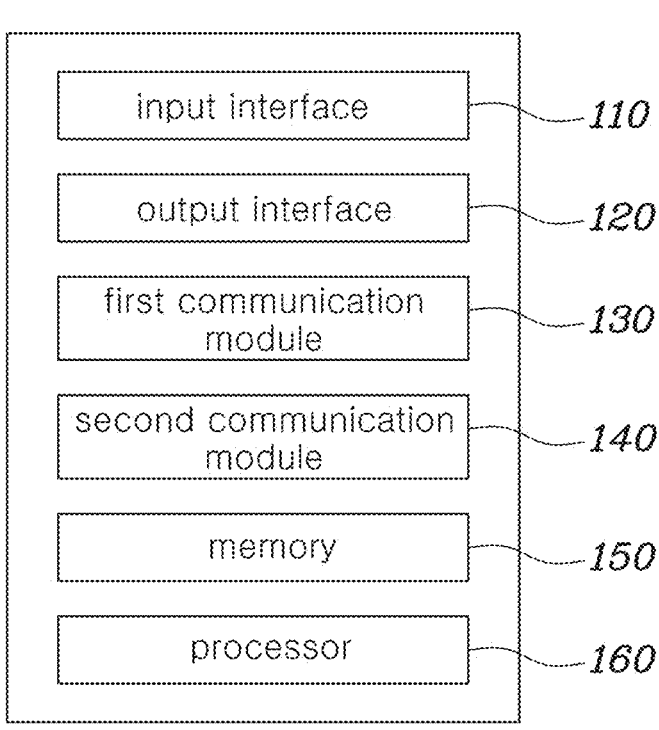
FIG. 2 shows an example of the configuration of the vehicle control system according to one example of the present disclosure.

FIG. 2 shows an example of the configuration of the vehicle control system 100 according to one example of the present disclosure.

Referring to FIG. 1 and FIG. 2, the vehicle control system 100 according to one example of the present disclosure may include an input interface 110, an output interface 120, a first communication module 130 (e.g., communication circuit such as Controller Area Network (CAN Bus), FlexRay, Ethernet, Media Oriented Systems Transport (MOST), Bluetooth, Wi-Fi, Cellular Communication, Zigbee/Z-wave, RF communication, etc.), a second communication module 140 (e.g., communication circuit), a memory 150, and a processor 160, and the configuration of the vehicle control system 100 is not limited thereto.

The input interface 110 may receive setting information input from a user, and may provide the received setting information to the processor 160.

For example, the input interface 110 may be a graphical user interface (GUI). For example, the input interface 110 may be a user setting menu or a user select manual (USM) interface.

According to one example, the input interface 110 may receive information on whether control is executed, control level information, etc. For example, the input interface 110 may receive control execution on signal or control execution off signal as the information on whether control is executed. For example, the input interface 110 may receive one of "strong" information, "medium" information, and "weak" information as the control level information, and the control level information may be changed in various ways depending on settings.

The output interface 120 may output the information provided from the processor 160 in a predetermined manner.

For example, the output interface 120 may be implemented separately from the input interface 110, and may be implemented to be integrated with the input interface 110.

According to one example, the output interface 120 may receive a speed limit situation, an acceleration control situation, a deceleration control situation, etc. from the processor 160, and may output the same.

The first communication module 130 (e.g., Controller Area Network (CAN Bus), FlexRay, Ethernet, Media Oriented Systems Transport (MOST), Bluetooth, Wi-Fi, Cellular Communication, Zigbee/Z-wave, RF communication, etc.) may be implemented to communicate with the information providing device 200. A communication method between the first information communication module 130 and the providing device 200 is not limited to any one method.

The first communication module 130 may receive the information provided from the information providing device 200, and may transmit the same to the processor 160.

The second communication module 140 (e.g., transmitter and/or receiver) may be implemented to communicate with the driving controller 300. A communication method between the second communication module 140 and the diving controller 300 is not limited to any one method.

The second communication module 140 may transmit the vehicle speed control value transmitted from the processor 160 to the driving controller 300.

The memory 150 may store algorithms configured to perform operation of the processor 160, and various information used to operate the processor 160, and may store information or results obtained or generated by performing operation of the processor 160.

For example, the memory 160 may store an algorithm used to predict the atmospheric pressure change (an atmospheric pressure change prediction algorithm), an algorithm used to determine the speed limit (a speed limit determination algorithm), an algorithm used to determine whether to limit the speed (a speed limit determination algorithm), an algorithm used to adjust the acceleration and the deceleration (an acceleration/deceleration adjustment algorithm), etc.

For example, the memory 150 may store a look-up table including the atmospheric pressure change limit value depending on the atmospheric pressure change (an atmospheric pressure look-up table), a look-up table including a weight depending on the control level (a weight look-up table), the first reference speed value used to determine whether to limit the speed, the second reference speed value used to determine whether to adjust the acceleration and the deceleration, a look-up table including the acceleration adjustment ratio depending on the acceleration demand (an acceleration adjustment look-up table), a look-up table including the deceleration adjustment ratio depending on the deceleration demand (a deceleration adjustment look-up table), etc.

For example, the memory 150 may include a volatile memory and/or a non-volatile memory. The volatile memory may include dynamic random access memory (DRAM), static RAM (SRAM), synchronous DRAM (SDRAM), phase-change RAM (PRAM), magnetic RAM (MRAM), resistive RAM (RRAM), ferroelectric RAM (FeRAM), or the like. The non-volatile memory may include read only memory (ROM), programmable ROM (PROM), electrically programmable ROM (EPROM), electrically erasable programmable ROM (EEPROM), flash memory, or the like.

The processor 160 may execute calculation or data processing regarding control of at least one other component of the vehicle control system 100. For example, the processor 160 may execute algorithms stored in the memory 150.

The processor 160 may process received data or data stored in the memory 150. The processor 160 may execute computer-readable codes (for example, algorithms) stored in the memory and instructions triggered by the processor 160.

The processor 160 may be a data processing device implemented as hardware having a circuit with a physical structure for executing desired operations. For example, the desired operations may include codes or instructions included in programs.

For example, the data processing device implemented as hardware may include a microprocessor, a central processing unit, a processor core, a multi-core processor, a multiprocessor, an application-specific integrated circuit (ASIC), or a field programmable gate array (FPGA).

Figure 3:
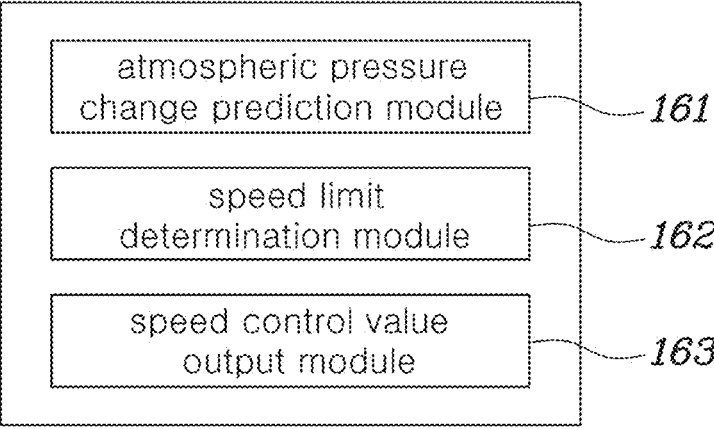
FIG. 3 shows an example of the configuration of a processor according to one example of the present disclosure.
Figure 4:
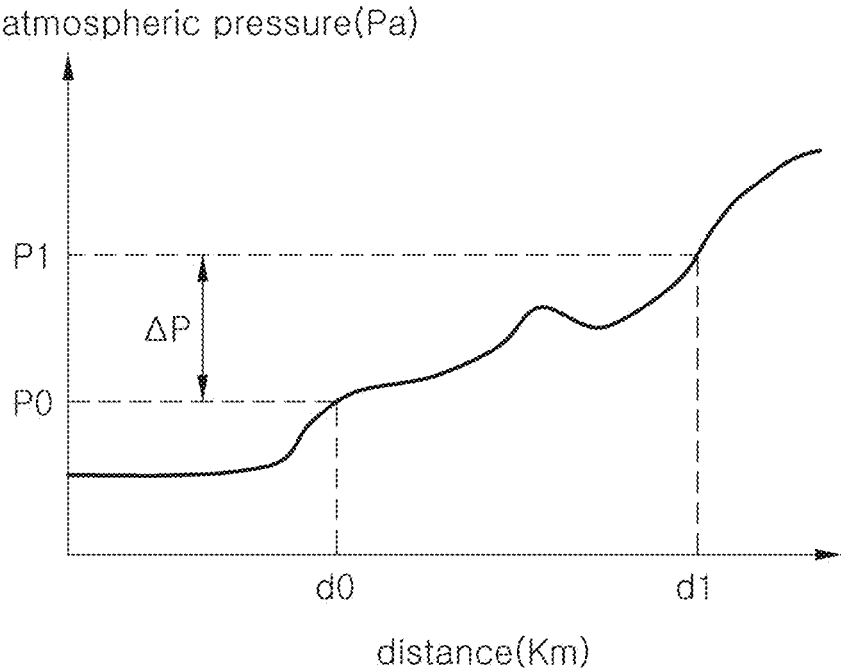
FIG. 4 shows an example of a graph for explaining an atmospheric pressure change predicted according to one example of the present disclosure.

FIG. 3 shows an example of the configuration of the processor 160 according to one example of the present disclosure, and FIG. 4 shows an example of a graph for explaining the atmospheric pressure change ΔP predicted according to one example of the present disclosure.

Referring to FIG. 1, FIG. 2, FIG. 3, and FIG. 4, the processor 160 according to one example of the present disclosure may pressure change an atmospheric pressure change prediction module 161, a speed limit determination module 162, and a speed control value output module 163. The terms such as "module", and the like refer to one or more units for processing at least one function or operation, which may be implemented by hardware (e.g., circuit, circuitry, ASIC, etc.), software, or a combination thereof.

The atmospheric pressure change prediction module 161 may predict the atmospheric pressure change based on the information provided from the information providing device 200.

According to one example, the atmospheric pressure change prediction module 161 may predict the atmospheric pressure change based on the road information and the atmospheric pressure information on the expected driving path provided from the information providing device 200.

According to one example, the atmospheric pressure change prediction module 161 may predict the atmospheric pressure change based on the driving distance of the vehicle 1 within the unit time, atmospheric pressure P0 at a prediction starting point do, atmospheric pressure P1 at a prediction endpoint d1, and an average speed $v_{avg}$ expected when driving from the prediction starting point do to the prediction endpoint d1.

In one example of the present disclosure, do may be expressed as a distance from the current position of the vehicle 1 to the prediction starting point, and d1 may be expressed as a distance from the current position of the vehicle 1 to the prediction endpoint.

The atmospheric pressure change prediction module 161 may predict the average speed $V_{avg}$ expected when driving from the prediction starting point d0 to the prediction endpoint d1 during the unit time based on a distance d1−d0 between the prediction starting point do and the prediction endpoint d1.

Further, the atmospheric pressure change prediction module 161 may predict the atmospheric pressure change ΔP within the unit time according to Equation 1 below.

$$\Delta P = \frac{|P1 - P0|}{(d1 - d0)/v_{avg}} \qquad \text{[Equation 1]}$$

In Equation 1, (d1−d0) is the distance between the prediction starting point d0 and the prediction endpoint d1, $V_{avg}$ is the average speed expected when driving from the prediction starting point d0 to the prediction endpoint d1 during the unit time, P0 is the atmospheric pressure at the prediction starting point d0, and P1 is the atmospheric pressure at the prediction endpoint d1.

The speed limit determination module 162 may determine the speed limit $v_{limit}$ based on the predicted atmospheric pressure change ΔP and the predetermined atmospheric pressure change limit value $\Delta P_{limit}$.

According to one example, the speed limit determination module 162 may determine the predetermined atmospheric pressure change limit value corresponding to the predicted atmospheric pressure change ΔP based on the atmospheric pressure look-up table stored in the memory 150.

After determining the predetermined atmospheric pressure change limit value $\Delta P_{limit}$, the speed limit determination module 162 may determine the speed limit $v_{limit}$ according to Equation 2 below.

$$v_{limit} = \frac{\Delta P_{limit} * (d1 - d0)}{|P1 - P0|} \qquad \text{[Equation 2]}$$

In Equation 2, $\Delta P_{limit}$ is the atmospheric pressure change limit value, (d1−d0) is the distance between the prediction starting point d0 and the prediction endpoint d1, P0 is the atmospheric pressure at the prediction starting point do, and P1 is the atmospheric pressure at the prediction endpoint d1.

According to one example, the speed limit determination module 162 may determine the speed limit $v_{limit}$ by applying a weight (control level weight) a to the atmospheric pressure change limit value $\Delta P_{limit}$ based on the control level information input through the input interface 110.

$$v_{limit} = \frac{(\Delta P_{limit} * a) * (d1 - d0)}{|P1 - P0|} \qquad \text{[Equation 3]}$$

The speed limit determination module 162 may determine the weight $\alpha$ corresponding to the control level information input through the input interface 110 based on the weight look-up table stored in the memory 150, and may the determined weight $\alpha$ to Equation 3.

The speed control value output module 163 may output the vehicle speed control value based on the predicted average speed $V_{avg}$ and the determined speed limit $v_{limit}$.

According to one example, if a value obtained by subtracting the determined speed limit the $v_{limit}$ from predicted average speed $V_{avg}$ exceeds the first reference speed value v1, the speed control value output module 163 may output the determined speed limit $v_{limit}$.

After outputting the determined speed limit $v_{limit}$, the speed control value output module 163 may determine whether an acceleration demand or a deceleration demand is input.

If the acceleration demand or the deceleration demand is input, the speed control value output module 163 may determine whether the value obtained by subtracting the determined speed limit $v_{limit}$ from the predicted average speed $V_{avg}$ is equal to or less than the first reference speed value v1 and exceeds the second reference speed value v2.

If the value obtained by subtracting the determined speed limit $v_{limit}$ from the predicted average speed $V_{avg}$ is equal to or less than the second reference speed value v2, the speed control value output module 163 may output an acceleration torque or a deceleration torque corresponding to the input acceleration demand or deceleration demand. That is, the speed control value output module 163 does not perform adjustment to the acceleration demand or the deceleration demand.

On the other hand, if the value obtained by subtracting the determined speed limit $v_{limit}$ from the predicted average speed $V_{avg}$ is equal to or less than the first reference speed value v1 and exceeds the second reference speed value v2, the speed control value output module 163 may output the acceleration torque by decreasing the acceleration demand according to the predetermined acceleration adjustment ratio, or may output the deceleration torque by increasing the deceleration demand according to the predetermined deceleration adjustment ratio.

Further, if the value obtained by subtracting the determined speed limit $v_{limit}$ from the predicted average speed $V_{avg}$ does not exceed the predetermined first reference speed value v1, the speed control value output module 163 may determine whether the acceleration demand or the deceleration demand is input.

If the acceleration demand or the deceleration demand is input, the speed control value output module 163 may determine whether the value obtained by subtracting the determined speed limit $v_{limit}$ from the predicted average speed $V_{avg}$ is equal to or less than the first reference speed value v1 and exceeds the second reference speed value v2.

If the value obtained by subtracting the determined speed limit $v_{limit}$ from the predicted average speed $V_{avg}$ is equal to or less than the second reference speed value v2, the speed control value output module 163 may output an acceleration torque or a deceleration torque corresponding to the input acceleration demand or deceleration demand.

That is, the speed control value output module 163 does not perform adjustment to the acceleration demand or the deceleration demand.

On the other hand, if the value obtained by subtracting the determined speed limit $v_{limit}$ from the predicted average speed $V_{avg}$ is equal to or less than the first reference speed value v1 and exceeds the second reference speed value v2, the speed control value output module 163 may output the acceleration torque by decreasing the acceleration demand according to the predetermined acceleration adjustment ratio, or may output the deceleration torque by increasing the deceleration demand according to the predetermined deceleration adjustment ratio.

Figure 5:
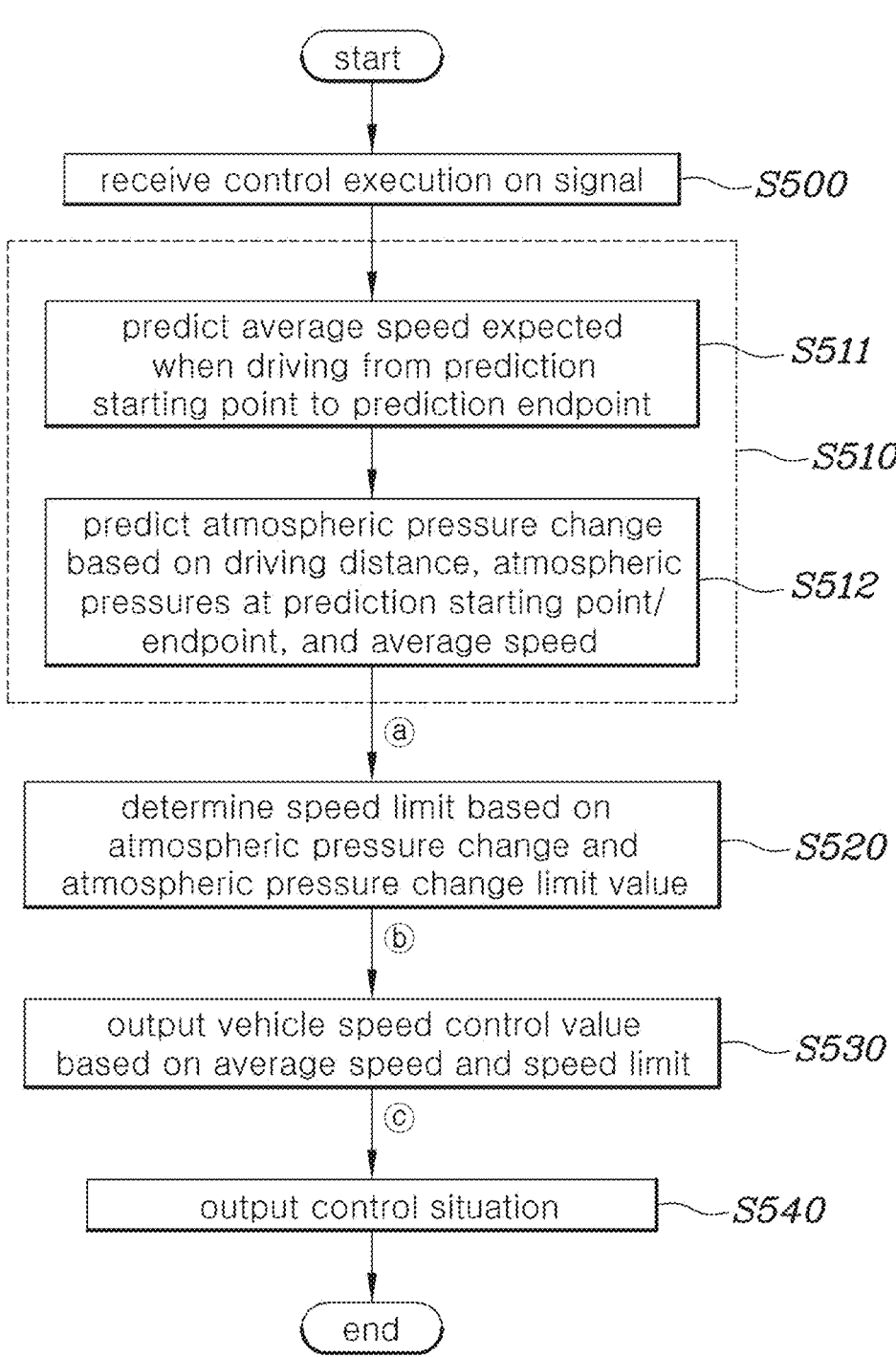
FIG. 5 shows an example of a flowchart representing a vehicle control method according to one example of the present disclosure.

FIG. 5 shows an example of a flowchart representing a vehicle control method according to one example of the present disclosure.

Respective operations shown in FIG. 5 may be performed by the vehicle control system 100 described with reference to FIG. 1, FIG. 2, FIG. 3, and FIG. 4.

Referring to FIG. 1, FIG. 2, FIG. 3, FIG. 4, and FIG. 5, if the vehicle control system 100 receives control execution on signal or control execution off signal through the input interface 110 (S500), the vehicle control system 100 may predict an atmospheric pressure change based on information provided from the information providing device 200 (S510).

In Operation S510, the vehicle control system 100 may predict the atmospheric pressure change within unit time based on road information and atmospheric pressure information on an expected driving path provided from the information providing device 200.

In Operation S510, the vehicle control system 100 may predict an average speed $V_{avg}$ expected when driving from a prediction starting point d0 to a prediction endpoint d1 during the unit time based on a distance between the prediction starting point d0 and the prediction endpoint d1 (S511).

Further, the vehicle control system 100 may predict an atmospheric pressure change $\Delta P$ based on the driving distance of the vehicle 1 within the unit time, atmospheric pressure P0 at the prediction starting point do, atmospheric pressure P1 at the prediction endpoint d1, and the average speed $V_{avg}$ expected when driving from the prediction starting point d0 to the prediction endpoint d1 (S512).

After Operation S510, the vehicle control system 100 may determine a speed limit $v_{limit}$ based on the predicted atmospheric pressure change $\Delta P$ and a predetermined atmospheric pressure change limit value $\Delta P_{limit}$ (S520).

Figure 6:
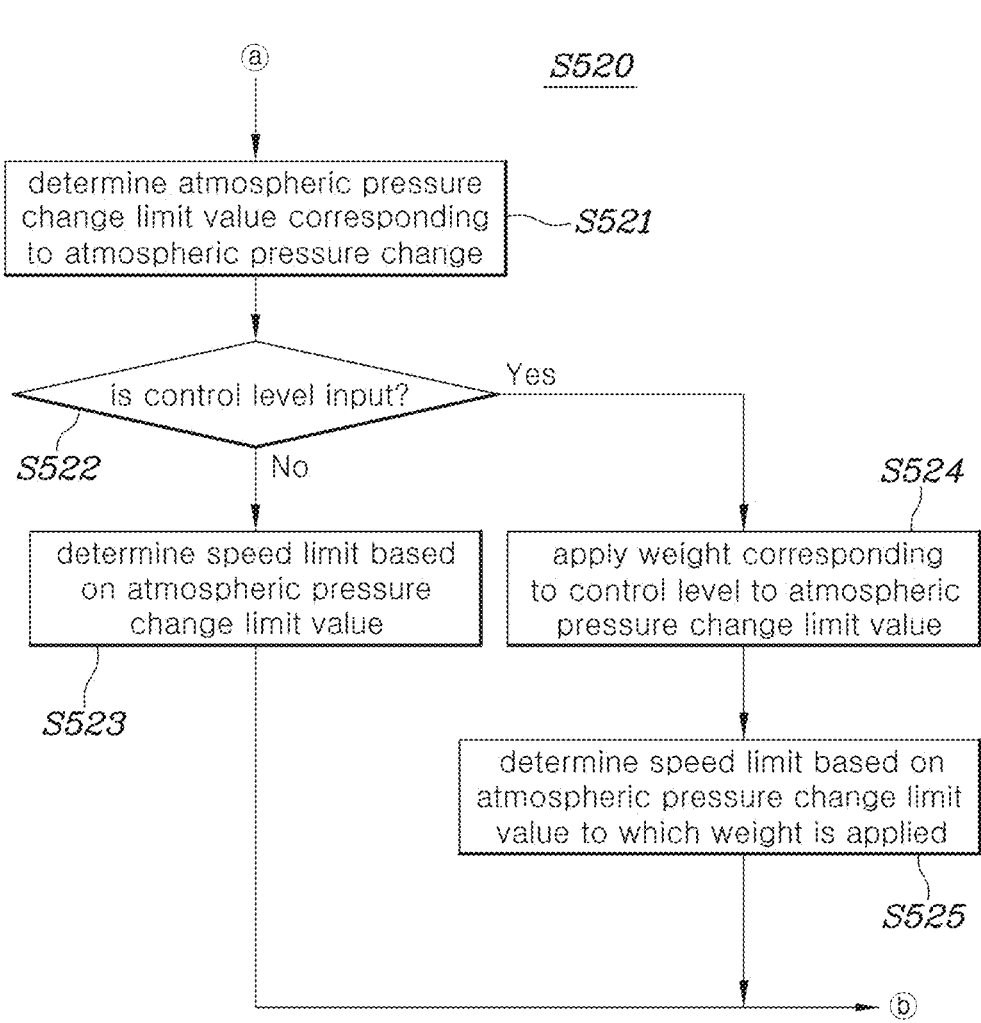
FIG. 6 shows an example of a flowchart representing Operation S520 of FIG. 5.

FIG. 6 shows an example of a flowchart representing Operation S520 of FIG. 5.

Referring to FIG. 6, the vehicle control system 100 may determine the atmospheric pressure change limit value $\Delta P_{limit}$ corresponding to the predicted atmospheric pressure change $\Delta P$ based on the atmospheric pressure look-up table stored in the memory 150 (S521).

Further, the vehicle control system 100 may determine whether a control level is input (S522).

If the control level is not input (No in S522), the vehicle control system 100 may determine the speed limit $v_{limit}$ based on the determined atmospheric pressure change limit value $\Delta P_{limit}$ (S523).

If the control level is input (Yes in S522), the vehicle control system 100 may determine a weight $\alpha$ corresponding to the control level based on the weight look-up table stored in the memory 150, and may apply the weight α to the atmospheric pressure change limit value $\Delta P_{limit}$ (S524).

Further, the vehicle control system 100 may determine the speed limit $v_{limit}$ based on the atmospheric pressure change limit value $\Delta P_{limit}$ to which the weight α is applied, as stated in Equation 3 (S525).

Referring again to FIG. 5, after Operation S520, the vehicle control system 100 may output a vehicle speed control value based on the predicted average speed $V_{avg}$ and the determined speed limit $v_{limit}$ (S530). Here, the vehicle speed control value may include at least one of the speed limit $v_{limit}$, an acceleration torque, or a deceleration torque.

Figure 7:
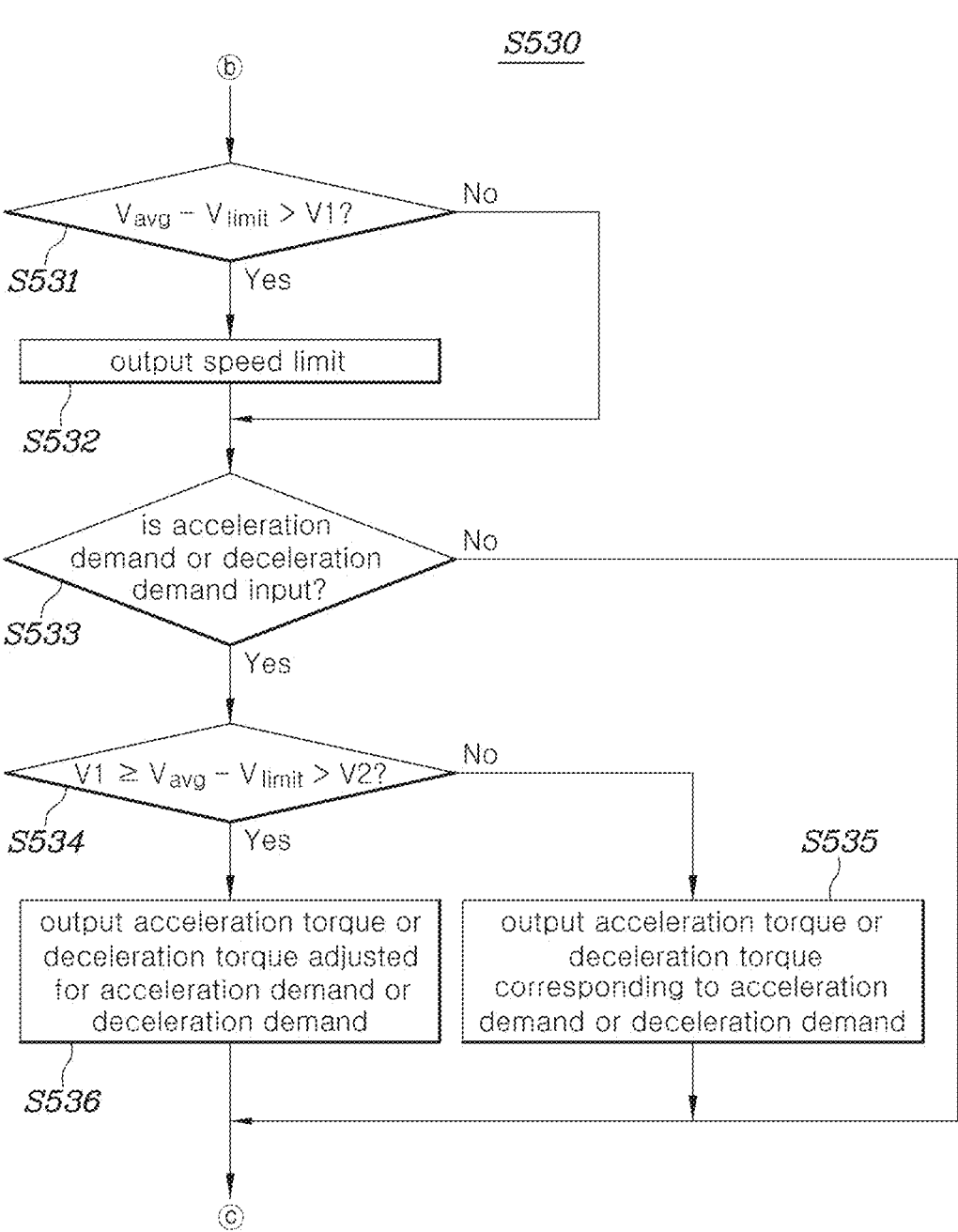
FIG. 7 shows an example of a flowchart representing Operation S530 of FIG. 5.

FIG. 7 shows an example of a flowchart representing Operation S530 of FIG. 5.

Referring to FIG. 7, the vehicle control system 100 may determine whether a value $v_{avg}-v_{limit}$ obtained by subtracting the determined speed limit $v_{limit}$ from the predicted average speed $V_{avg}$ exceeds a predetermined first reference speed value v1 (S531).

In response that the value $V_{avg}-v_{limit}$ obtained by subtracting the determined speed limit $v_{limit}$ from the predicted average speed $V_{avg}$ exceeds the predetermined first reference speed value v1 (Yes in S531), that is, in response that a first condition is satisfied, the vehicle control system 100 may output the speed limit $v_{limit}$ (S532).

After outputting the speed limit $v_{limit}$, the vehicle control system 100 may determine whether an acceleration demand or a deceleration demand is input (S533).

In response that the acceleration demand or the deceleration demand is not input (No in S533), the vehicle control system 100 may terminate control for the corresponding unit time.

In response that the acceleration demand or the deceleration demand is input (Yes in S533), the vehicle control system 100 may determine whether the value $v_{avg}-v_{limit}$ obtained by subtracting the speed limit $v_{limit}$ from the average speed $V_{avg}$ is equal to or less than the first reference speed value v1 and exceeds a second reference speed value v2 (i.e., whether a second condition is satisfied) (S534).

In response that the second condition is not satisfied, that is, in response that the value $V_{avg}-v_{limit}$ obtained by subtracting the speed limit $v_{limit}$ from the average speed $V_{avg}$ is equal to or less than the second reference speed value v2 (No in S534), the vehicle control system 100 may output an acceleration torque or a deceleration torque corresponding to the input acceleration demand or deceleration demand (S535).

That is, the vehicle control system 100 does not perform adjustment to the acceleration demand or the deceleration demand.

In response that the second condition is satisfied, that is, the value $V_{avg}-v_{limit}$ obtained by subtracting the speed limit $v_{limit}$ from the average speed $V_{avg}$ is equal to or less than the first reference speed value v1 and exceeds the second reference speed value v2 (Yes in S534), the vehicle control system 100 may output an acceleration torque for a deceleration torque adjusted for the acceleration demand or the deceleration demand (S536).

In Operation S536, the vehicle control system 100 may output the acceleration torque by decreasing the acceleration demand according to a predetermined acceleration adjustment ratio, or may output the deceleration torque by increasing the deceleration demand according to a predetermined deceleration adjustment ratio.

Referring again to FIG. 5, after Operation S530, the vehicle control system 100 may output a speed limit situation, an acceleration control situation, a deceleration control situation, etc. (S540).

Therefore, the present disclosure has been made in view of the above problems, and it is an object of the present disclosure to provide a system and method that may control a vehicle by reflecting changes in atmospheric pressure related to altitude, and a vehicle including the same.

It is another object of the present disclosure to provide a system and method that may predict an average speed and an atmospheric pressure change on the driving path of a vehicle for unit time, may determine a speed limit based on the atmospheric pressure change and a predetermined atmospheric pressure change limit value, and may output a vehicle speed control value to control the speed of the vehicle based on the average speed and the speed limit, and a vehicle including the same.

It is yet another object of the present disclosure to provide a system and method that may limit the speed of a vehicle by outputting a speed limit based on comparison between an average speed and the speed limit, and a vehicle including the same.

It is still another object of the present disclosure to provide a system and method that may determine whether to adjust an acceleration demand or a deceleration demand based on comparison between the average speed and the speed limit of a vehicle, and outputs an acceleration torque or a deceleration torque adjusted for the acceleration demand or the deceleration demand if used, so as to control the acceleration or deceleration of the vehicle, and a vehicle including the same.

The technical objects of the present disclosure are not limited to the matters described above, and from the following description, those skilled in the art will be able to clearly understand other objects of the present disclosure.

As a technical means for achieving the above-described technical objects, there may be provided a system and method that may control a vehicle by reflecting changes in atmospheric pressure, and a vehicle including the same.

In accordance with an example of the present disclosure, the above and other objects can be accomplished by the provision of a vehicle control system including at least one communication module configured to communicate with an external device, and a processor configured to predict an average speed and an atmospheric pressure change on a driving path of a vehicle based on information provided through the at least one communication module1, to determine a speed limit based on the atmospheric pressure change and a predetermined atmospheric pressure change limit value, and to output a vehicle speed control value to control a speed of the vehicle based on the average speed and the speed limit.

The processor may predict the average speed expected when driving from a prediction starting point to a prediction endpoint during unit time based on a distance between the prediction starting point and the prediction endpoint.

The processor may predict the atmospheric pressure change based on a driving distance of the vehicle, atmospheric pressure at the prediction stating point, atmospheric pressure at the prediction endpoint, and the average speed for the unit time.

The processor may determine the atmospheric pressure change limit value corresponding to the atmospheric pressure look-up change based on a table, and may determine the speed limit based on the atmospheric pressure change limit value, a distance between a prediction starting point and a prediction endpoint, atmospheric pressure at the prediction stating point, and atmospheric pressure at the prediction endpoint.

The vehicle control system may further include an input interface configured to receive control level information, and the processor may determine the speed limit after applying a weight corresponding to the control level information to the atmospheric pressure change limit value.

The processor may output the speed limit as the vehicle speed control value, in response that a value obtained by subtracting the speed limit from the average speed exceeds a predetermined first reference speed value.

After outputting the speed limit, the processor may determine whether an acceleration demand or a deceleration demand is input, may determine whether the value obtained by subtracting the speed limit from the average speed is equal to or less than the first reference speed value and exceeds a predetermined second reference speed value, in response that the acceleration demand or the deceleration demand is input, and may output an acceleration torque or a deceleration torque depending on a determination result.

The processor may output the acceleration torque or the deceleration torque adjusted for the acceleration demand or the acceleration demand, in response that the value obtained by subtracting the speed limit from the average speed is equal to or less than the first reference speed value and exceeds the second reference speed value.

The processor may output the acceleration torque by decreasing the acceleration demand according to a predetermined acceleration adjustment ratio, or may output the deceleration torque by increasing the deceleration demand according to a predetermined deceleration adjustment ratio.

In accordance with another example of the present disclosure, there is provided a vehicle control method of controlling a vehicle based on information provided from an external device, the vehicle control method including predicting an average speed and an atmospheric pressure change on a driving path of the vehicle, determining a speed limit based on the atmospheric pressure change and a predetermined atmospheric pressure change limit value, and outputting a vehicle speed control value to control a speed of the vehicle based on the average speed and the speed limit.

Predicting the average speed and the atmospheric pressure change may include predicting the average speed expected when driving from a prediction starting point to a prediction endpoint during unit time based on a distance between the prediction starting point and the prediction endpoint.

Predicting the average speed and the atmospheric pressure change may include predicting the atmospheric pressure change based on a driving distance of the vehicle, atmospheric pressure at the prediction stating point, atmospheric pressure at the prediction endpoint, and the average speed for the unit time.

Determining the speed limit may include determining the atmospheric pressure change limit value corresponding to the atmospheric pressure change based on a look-up table, and determining the speed limit based on the atmospheric pressure change limit value, a distance between a prediction starting point and a prediction endpoint, atmospheric pressure at the prediction stating point, and atmospheric pressure at the prediction endpoint.

The vehicle control method may further include receiving control level information, and determining the speed limit may include determining the speed limit after applying a weight corresponding to the control level information to the atmospheric pressure change limit value.

Outputting the vehicle speed control value may include outputting the speed limit as the vehicle speed control value, in response that a value obtained by subtracting the speed limit from the average speed exceeds a predetermined first reference speed value.

Outputting the vehicle speed control value may further include, after outputting the speed limit, determining whether an acceleration demand or a deceleration demand is input, determining whether the value obtained by subtracting the speed limit from the average speed is equal to or less than the first reference speed value and exceeds a predetermined second reference speed value, in response that the acceleration demand or the deceleration demand is input, and outputting an acceleration torque or a deceleration torque depending on a determination result.

Outputting the vehicle speed control value may further include outputting the acceleration torque or the deceleration torque adjusted for the acceleration demand or the acceleration demand, in response that the value obtained by subtracting the speed limit from the average speed is equal to or less than the first reference speed value and exceeds the second reference speed value.

Outputting the acceleration torque or the deceleration torque may include outputting the acceleration torque by decreasing the acceleration demand according to a predetermined acceleration adjustment ratio, or outputting the deceleration torque by increasing the deceleration demand according to a predetermined deceleration adjustment ratio.

In accordance with a further example of the present disclosure, there is provided a vehicle including an information providing device configured to provide information configured to control the vehicle, and a vehicle control system configured to predict an average speed and an atmospheric pressure change on a driving path of the vehicle for unit time based on information provided through the at least one communication module, to determine a speed limit based on the atmospheric pressure change and a predetermined atmospheric pressure change limit value, and to output a vehicle speed control value to control a speed of the vehicle based on the average speed and the speed limit.

The vehicle may further include a powertrain configured to generate power to drive the vehicle, and a drive controller configured to control the powertrain based on the vehicle speed control value output from the vehicle control system.

Specific details according to various examples of the present disclosure other than the above-mentioned means for achieving the technical objects are included in the description and drawings below.

As is apparent from the above description, according to examples of the present disclosure, a system and method that may control a vehicle by reflecting changes in atmospheric pressure related to altitude, and a vehicle including the same may be provided.

According to the examples, because vehicle control may be performed by reflecting changes in atmospheric pressure related to altitude, sudden changes in altitude of the vehicle may be prevented, and driver/passenger discomfort or health problems may be prevented.

Further, stable driving of the vehicle may be induced by preventing sudden acceleration or deceleration through adjustment of acceleration an demand or a deceleration demand, thereby being capable of preventing driver/passenger discomfort or health problems.

In addition, because the control technology of the present disclosure may be implemented in software without changing hardware, the value of the vehicle may be increased while reducing the burden of development costs and vehicle price.

The effects of the present disclosure are not limited to the effects mentioned above, and other effects not mentioned will be clearly understood by those skilled in the art from the above description.

The above-mentioned problems to be solved, means of solving the problems, and the contents of the effects do not specify the essential features of the claims, and thus, the scope of the claims is not limited by the matters described in the content of the disclosure.

Although the examples of the present disclosure have been described in detail with reference to the accompanying drawings, the present disclosure is not limited to these examples, and various modifications may be made without departing from the technical spirit of the present disclosure. Accordingly, the examples disclosed in this specification are not intended to limit the technical idea of the present disclosure but disclosed for illustrative purposes, and the scope of the technical idea of the present disclosure is not limited by these examples. Therefore, the above-described examples should be understood as illustrative and not restrictive in all respects. The scope and spirit of the present disclosure should be interpreted by the claims, and all technical ideas within the equivalent scope should be interpreted as being included in the scope of the present disclosure.

What is claimed is:

1. An apparatus for controlling autonomous driving of a vehicle, the apparatus comprising:

at least one communication circuit configured to communicate with an external device; and a processor configured to:

identify, based on information provided through the at least one communication circuit, an average speed and atmospheric pressure change on a driving path of the vehicle;

determine, based on a look-up table, an atmospheric pressure change limit value corresponding to the atmospheric pressure change;

determine, based on the atmospheric pressure change and the atmospheric pressure change limit value, a speed limit;

output, based on the average speed and the speed limit, a vehicle speed control value; and control, based on the output vehicle speed control value, autonomous driving of the vehicle, wherein the processor is configured to determine the speed limit based on:

the atmospheric pressure change limit value, a driving distance between a prediction starting point and a prediction endpoint, a first atmospheric pressure at the prediction stating point, and a second atmospheric pressure at the prediction endpoint, the speed limit.

2. The apparatus according to claim 1, wherein the processor is configured to predict, based on the driving distance of the vehicle between the prediction starting point and the prediction endpoint, the average speed.

3. The apparatus according to claim 2, wherein the processor is configured to predict, based on the driving distance, the first atmospheric pressure at the prediction stating point, the second atmospheric pressure at the prediction endpoint, and the average speed, the atmospheric pressure change.

4. The apparatus according to claim 1, further comprising an input interface configured to receive control level information, wherein the processor is further configured to determine, based on applying a weight to the atmospheric pressure change limit value, the speed limit, wherein the weight corresponds to the control level information.

5. The apparatus according to claim 1, wherein the processor is configured to output, based on a difference, between a value of the speed limit and a value of the average speed, exceeding a first reference speed value, the speed limit as the vehicle speed control value.

6. The apparatus according to claim 5, wherein, after outputting the speed limit, the processor is configured to:

determine whether an acceleration demand or a deceleration demand is input;

determine, based on the acceleration demand or the deceleration demand, whether the difference is equal to or less than the first reference speed value and greater than a second reference speed value; and output, based on determining whether the difference is equal to or less than the first reference speed value and greater than the second reference speed value, an acceleration torque or a deceleration torque.

7. The apparatus according to claim 6, wherein the processor is configured to output, based on the difference being equal to or less than the first reference speed value and greater than the second reference speed value, the acceleration torque or the deceleration torque, wherein the acceleration torque or the deceleration torque are adjusted based on the acceleration demand or the acceleration demand.

8. The apparatus according to claim 7, wherein the processor is configured to:

output the acceleration torque by decreasing, based on an acceleration adjustment ratio, the acceleration demand; or output the deceleration torque by increasing, based on a deceleration adjustment ratio, the deceleration demand.

9. A method performed by a vehicle for controlling autonomous driving of the vehicle, the method comprising:

identifying, based on information provided through at least one communication circuit configured to communicate with an external device, an average speed and atmospheric pressure change on a driving path of the vehicle;

determining, based on a look-up table, an atmospheric pressure change limit value corresponding to the atmospheric pressure change;

determining, based on the atmospheric pressure change and the atmospheric pressure change limit value, a speed limit, wherein determining the speed limit comprises:

determining, based on the atmospheric pressure change limit value, a driving distance between a prediction starting point and a prediction endpoint, a first atmospheric pressure at the prediction stating point, and a second atmospheric pressure at the prediction endpoint, the speed limit;

outputting, based on the average speed and the speed limit, a vehicle speed control value; and controlling, based on the output vehicle speed control value, autonomous driving of the vehicle.

10. The method according to claim 9, wherein predicting the average speed and the atmospheric pressure change comprises predicting, based on the driving distance of the vehicle between the prediction starting point and the prediction endpoint, the average speed for a unit of time.

11. The method according to claim 10, wherein predicting the average speed and the atmospheric pressure change comprises predicting the atmospheric pressure change based on:

the driving distance of the vehicle, the first atmospheric pressure at the prediction stating point, the second atmospheric pressure at the prediction endpoint, and the average speed.

12. The method according to claim 9, further comprising: receiving control level information, wherein determining the speed limit comprises further determining, based on applying a weight to the atmospheric pressure change limit value, the speed limit, wherein the weight corresponds to the control level information.

13. The method according to claim 9, wherein outputting the vehicle speed control value comprises outputting, based on a difference, between a value of the speed limit and a value of the average speed, exceeding a first reference speed value, the speed limit as the vehicle speed control value.

14. The method according to claim 13, wherein the outputting the speed limit comprises:

determining whether an acceleration demand or a deceleration demand is input;

determining, based on the acceleration demand or the deceleration demand, whether the difference is equal to or less than the first reference speed value and greater than a second reference speed value; and outputting, based on determining whether the difference is equal to or less than the first reference speed value and greater than the second reference speed value, an acceleration torque or a deceleration torque.

15. The method according to claim 14, wherein outputting the vehicle speed control value further comprises outputting, based on determining whether the difference is equal to or less than the first reference speed value and greater than the second reference speed value, the acceleration torque or the deceleration torque, wherein the acceleration torque or the deceleration torque are adjusted based on the acceleration demand or the acceleration demand.

16. The method according to claim 15, wherein outputting the acceleration torque or the deceleration torque comprises:

outputting the acceleration torque by decreasing, based on an acceleration adjustment ratio, the acceleration demand; or outputting the deceleration torque by increasing, based on a deceleration adjustment ratio, the deceleration demand.

17. A vehicle comprising:

at least one communication circuit configured to provide information configured to control autonomous driving of the vehicle; and a vehicle control apparatus comprising a processor to:

predict, based on the information, an average speed and an atmospheric pressure change on a driving path of the vehicle;

determine, based on a look-up table, an atmospheric pressure change limit value corresponding to the atmospheric pressure change;

determine, based on the atmospheric pressure change and the atmospheric pressure change limit value, a speed limit; and output, based on the average speed and the speed limit, a vehicle speed control value for controlling autonomous driving of the vehicle, wherein the processor is configured to determine the speed limit based on:

the atmospheric pressure change limit value, a driving distance between a prediction starting point and a prediction endpoint, a first atmospheric pressure at the prediction stating point, and a second atmospheric pressure at the prediction endpoint, the speed limit.

18. The vehicle according to claim 17, further comprising:

a powertrain configured to generate power to drive the vehicle; and a drive controller configured to control, based on the vehicle speed control value output from the vehicle control apparatus, the powertrain.

* * * * *